United States Patent
Hatabu (10) Patent No.: US 9,514,544 B2
(45) Date of Patent: Dec. 6, 2016

(54) STORAGE MEDIUM, METHOD, AND DEVICE FOR EVALUATING IMPORTANCE OF IN-IMAGE REGION

(71) Applicant: NEC Corporation, Tokyo (JP)

(72) Inventor: Atsushi Hatabu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/786,938

(22) PCT Filed: Apr. 15, 2014

(86) PCT No.: PCT/JP2014/002133
§ 371 (c)(1),
(2) Date: Oct. 23, 2015

(87) PCT Pub. No.: WO2014/174799
PCT Pub. Date: Oct. 30, 2014

(65) Prior Publication Data
US 2016/0071288 A1    Mar. 10, 2016

(30) Foreign Application Priority Data
Apr. 25, 2013   (JP) .................................. 2013-092267

(51) Int. Cl.
*G06K 9/00* (2006.01)
*G06T 7/40* (2006.01)
(Continued)

(52) U.S. Cl.
CPC .............. *G06T 7/408* (2013.01); *G06K 9/4652* (2013.01); *G06K 9/52* (2013.01); *G06T 7/0081* (2013.01);
(Continued)

(58) Field of Classification Search
None
See application file for complete search history.

(56) References Cited

U.S. PATENT DOCUMENTS

| | | | |
|---|---|---|---|
| 7,110,450 B1 * | 9/2006 | Kimoto ................... | G06T 9/004 375/240 |
| 8,224,099 B2 * | 7/2012 | Mitsuhashi ............ | H04N 19/63 382/218 |
| 2009/0110281 A1 * | 4/2009 | Hirabayashi ....... | G06K 9/00993 382/180 |

FOREIGN PATENT DOCUMENTS

| | | |
|---|---|---|
| JP | 2002-204459 | 7/2002 |
| JP | 2005-197879 | 7/2005 |

(Continued)

OTHER PUBLICATIONS

R. Achanta et al., "Frequency-tuned Salient Region Detection", Computer Vision and Pattern Recognition, pp. 1597-1604, Jun. 2009.

(Continued)

*Primary Examiner* — Feng Niu
(74) *Attorney, Agent, or Firm* — Finnegan, Henderson, Farabow, Garrett & Dunner LLP (57) ABSTRACT

Provided is a device for evaluating the importance of an in-image region and that can appropriately evaluate the importance in terms of meaning of an in-image region. A processing unit performs a process including color reduction with respect to an evaluation subject region of an image. An importance determination unit determines the importance of the evaluation subject region on the basis of the degree of magnitude of the error between the pre-processing signal value of the evaluation subject region and the post-processing signal value of the evaluation subject region.

9 Claims, 3 Drawing Sheets

(51) Int. Cl.
*G06T 7/20* (2006.01)
*G06K 9/46* (2006.01)
*G06K 9/52* (2006.01)
*G06T 7/00* (2006.01)

(52) U.S. Cl.
CPC ....... *G06T 7/20* (2013.01); *G06T 2207/10024* (2013.01)

(56) References Cited

FOREIGN PATENT DOCUMENTS

JP         2007-74091      3/2007
WO    WO 2009/004996    1/2009

OTHER PUBLICATIONS

J. Sagara et al., "The Relation between Conspicuousness and Saliencies of Hue, Saturation and Brightness", ITE Technical Report, vol. 34, No. 54, pp. 49-52, Dec. 2010 Abstract.

K. Inoue et al., "Saliency Map Based on Color Histograms of Inside and Outside of Clipped Rectangular Region", The Journal of the Institute of Image Information and Television Engineers, vol. 65, No. 7, pp. 996-999, Jul. 2011 Abstract.

International Search Report and Written Opinion mailed Jul. 15, 2014 in corresponding PCT International Application.

\* cited by examiner

STORAGE MEDIUM, METHOD, AND DEVICE FOR EVALUATING IMPORTANCE OF IN-IMAGE REGION

CROSS-REFERENCE TO RELATED PATENT APPLICATIONS

This application is a National Stage Entry of International Application No. PCT/JP2014/002133, filed Apr. 15, 2014, which claims priority from Japanese Patent Application No. 2013-092267, filed Apr. 25, 2013. The entire contents of the above-referenced applications are expressly incorporated herein by reference.

TECHNICAL FIELD

The present invention relates to a device for evaluating importance of in-image region, a method for evaluating importance of in-image region and a storage medium for evaluating importance of an in-image region.

BACKGROUND ART

A screen transmission system, which transmits image information of a computer's screen from a server to a client via a network, is known. In order to reduce an amount of data of communication between the server and the client, an art that the server transmits image information included in a differential region corresponding to a region which displays contents of a present screen changing from contents of a previous screen, and an art of coding the image information included in the differential region are applied to the screen transmission system.

PTL 1 describes an art for determining priority of each differential region and controlling an order of transmitting differential regions according to the priority. As an example of a method for determining the priority, PTL 1 describes that the priority is determined on the basis of pixel values of pixels included in the differential region and an area of the differential region.

Moreover, it is conceivable that, for example, a region which displays a character, an icon or the like out of in-image regions has semantic importance. As a usual method for specifying the character displaying region, for example, a method for specifying the character displaying region on the basis of smallness in number of used colors, a histogram, edge density or the like is conceivable. Moreover, it is also conceivable to specify the character displaying region on the basis of variance or contrast of signal values (pixel values) of the region.

As a related art for specifying the character displaying region, an art to detect the character displaying region by use of a telop (television opaque projector) (for example, refer to PTLs 2, 3 and 4). According to an art described in PTL 2, a user designates a character region on an image to generate a region designating signal which indicates the character region. According to an art described in PTL 3, information, which indicates similarity to the telop, is generated on the basis of a differential value between the maximum luminance and the minimum luminance. According to an art described in PTL 4, a region including the telop is determined according to density of edge.

As a usual method for a binarization process, there is a method for carrying out the binarization by calculating a threshold value on the basis of a histogram.

CITATION LIST

Patent Literature

PTL 1: WO 2009/004996
PTL 2: Japanese Patent Application Laid-Open Publication No. 2002-204459
PTL 3: Japanese Patent Application Laid-Open Publication No. 2005-197879
PTL 4: Japanese Patent Application Laid-Open Publication No. 2007-74091

SUMMARY OF INVENTION

Technical Problem

However, when estimating a region, which has semantic importance, within an image by the above usual method or the method described in the above patent literatures, accuracy of the estimation may become limited. For example, in the case of estimating the region, which has semantic importance, on the basis of smallness in number of colors, importance of a region which should be evaluated high originally, may be underestimated. Specifically, for example, a region including an anti-aliased character, a region including a gray scale icon or the like is a region whose importance should be evaluated high originally. However, when evaluating the importance on the basis of smallness in number of colors, the importance of each region is evaluated low.

In addition, when estimating a region, which has semantic importance, on the basis of variance or contrast of a signal value of an image, importance of a region corresponding to a natural image (for example, an image containing grasses, hairs or the like), which has a large local-variation and has difficulty in the compression coding, is evaluated excessively.

Moreover, according to the art described in PTLs 3 and 4, importance of a region, which is corresponding to an icon displayed with a little low contrast or which is corresponding to a fine character or line drawing, has tendency to be evaluated too low.

An object of the present invention is to provide an in-image region importance evaluating device and an in-image region importance evaluating method and a storage medium which can appropriately evaluate the semantic importance of the in-image region.

Technical Problem

An in-image region importance evaluating device according to the present invention includes a processing unit which carries out processing, which includes color reduction, to an evaluation subject region of an image, and an importance determination unit which determines importance of the evaluation subject region on the basis of magnitude of a difference between a signal value of the evaluation subject region before processing and a signal value of the evaluation subject region after processing.

An in-image region importance evaluating method according to the present invention includes carrying out processing, which includes color reduction, to an evaluation subject region of an image, and determining importance of the evaluation subject region on the basis of a degree of magnitude of an error between a signal value of the evaluation subject region before processing and a signal value of the evaluation subject region after processing.

A non-transitory computer readable storage medium recording thereon a program according to the present invention that causes a computer to execute a processing process of carrying out processing, which includes color reduction, to an evaluation subject region of an image, and a importance determination process of determining importance of the evaluation subject region on the basis of magnitude of a difference between a signal value of the evaluation subject region before processing and a signal value of the evaluation subject region after processing.

Advantageous Effects of Invention

According to the present invention, it is possible to appropriately evaluate the semantic importance of the in-image region.

Hereinafter, an exemplary embodiment of the present invention will be described with reference to the drawings.

An in-image region importance evaluating device according to the present exemplary embodiment evaluates semantic importance of a region existing within an image which displays a screen. As an example of a region which has high semantic importance, a region which displays a character, a region which displays an icon, or the like is exemplified. In the region which has semantic importance, the character, the icon or the like is often displayed in a small number of colors. By using the above-mentioned point, the in-image region importance evaluating device according to the present exemplary embodiment evaluates the semantic importance of the region existing within the image which displays the screen.

A pixel of the image is expressed by a signal. While a form of the signal which expresses the pixel is not limited in particular, the RGB form or the YUV form is exemplified. The image is not limited to a color image, and may be a gray scale image.

In order to simplify description on the present exemplary embodiment, it is assumed that a region which is an importance evaluation subject (hereinafter, referred to as an "evaluation subject region") is inputted into the in-image region importance evaluating device. However, the in-image region importance evaluating device may extract the evaluation subject region from an inputted image. A method for extracting the evaluation subject region from one image is not limited in particular. For example, the in-image region importance evaluating device may compare an image displayed on the latest screen to an image displayed on a screen previous to the latest screen, and determine a differential region, which is an individual region of the latest screen changing from the previous screen, as the evaluation subject region. For example, the in-image region importance evaluating device may determine an individual region, which is generated by dividing one screen into regions having a fixed size, as the evaluation subject region.

The in-image region importance evaluating device of the present exemplary embodiment is applied to, for example, a server which transmits image information of a screen to a thin client. The importance of the evaluation subject region, which is determined by the in-image region importance evaluating device, may be used for control of a transmitting order of each region which is carried out by the server.

Figure 1:
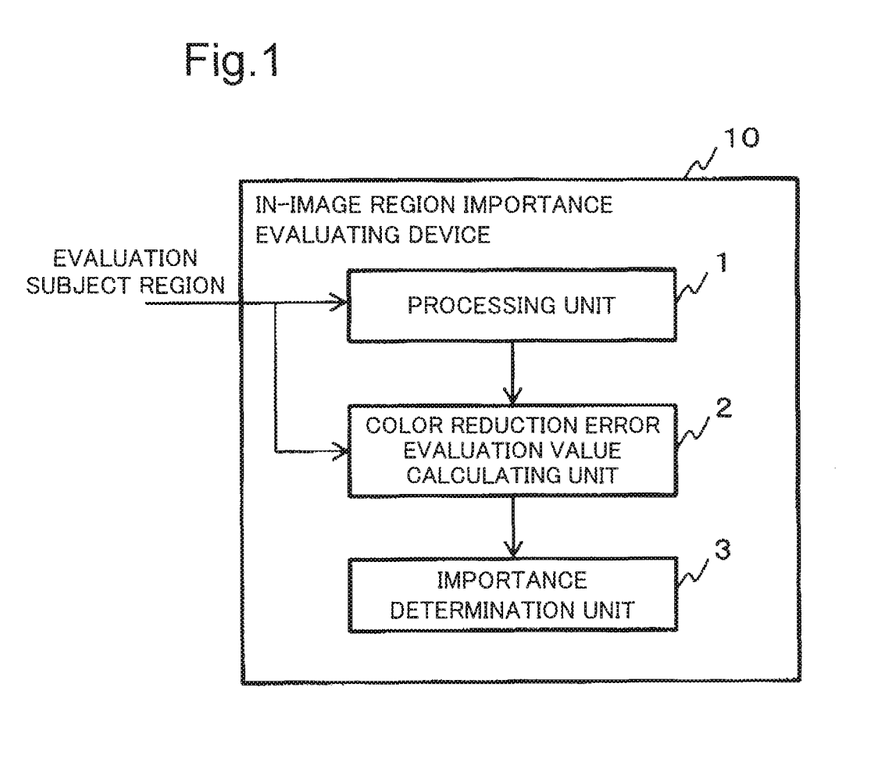
FIG. 1 is a block diagram showing an exemplary embodiment of an in-image region importance evaluating device according to the present invention.

FIG. 1 is a block diagram showing the in-image region importance evaluating device of the present exemplary embodiment. An in-image region importance evaluating device 10 includes a processing unit 1, a color reduction error evaluation value calculating unit 2 and an importance determination unit 3.

The processing unit 1 carries out processing, which includes color reduction, to the evaluation subject region. Specifically, the processing unit 1 carries out the color reduction to the evaluation subject region and expands the evaluation subject region.

Firstly, the color reduction will be described in the following. At a time of carrying out the color reduction, the processing unit 1 reduces color of a pixel included in the evaluation subject region, so that degradation may not be salient.

As a method of the color reduction, for example, a method of reducing the number of signal components of the pixel, which is included in the evaluation subject region, is exemplified. Hereinafter, the above-mentioned method is denoted as a first color reduction method. A specific example of the first color reduction method will be described in the following. It is assumed that a signal of the pixel is based on the RGB form. In this case, the signal of one pixel is expressed by three signal components of R, G and B. In other words, the signal of one pixel is expressed by a three-dimensional vector. For example, the processing unit 1 may carry out the color reduction by removing two signal components out of three signal components. One signal component, which is left after the color reduction, may be, for example, an one-dimensional gray scale signal. Moreover, for example, the processing unit 1 may convert the signal based on the RGB form into a signal based on the YUV form, and use a Y signal component as one signal component which is left after the color reduction.

As another color reduction method, a method of reducing number of colors of the pixel which is included in the evaluation subject region. Hereinafter, the above-mentioned method is denoted as a second color reduction method. As a specific example of the second color reduction method, to reduce variations of a value which a signal component of the pixel can have (for example, binarization) is exemplified. As the second color reduction method, there is also a method for rounding down a lower bit of the signal value of the pixel.

The processing unit 1 expands the evaluation subject region after carrying out the color reduction. Variations of the signal component of each pixel of the evaluation subject region, to which the expansion has been carried out already, are the same as variations of the signal component of each pixel of the evaluation subject region to which the processing (color reduction and expansion) is not carried out yet. For example, it is assumed that an original evaluation subject region (denoted as X) is expressed in 32-bit color. Furthermore, it is assumed that the processing unit 1 carries out a process, in which two typical colors are selected and the number of colors is reduced and compressed to two, to the evaluation subject region X. The processing unit 1 carries out the expansion to the evaluation subject region whose colors have been reduced already, and obtains an evaluation subject region (denoted as Y) which is expressed in 32-bit color. A difference is caused between a signal value of the evaluation subject region X and a signal value of the evaluation subject region Y after processing.

A value, which indicates magnitude of the difference between the signal value of the evaluation subject region before processing carried out by the processing unit 1 (including color reduction and expansion) and the signal value of the evaluation subject region after processing, is denoted as a color reduction error evaluation value. The color reduction error evaluation value calculating unit 2 calculates the color reduction error evaluation value.

Hereinafter, it is assumed that information for identifying the pixel is expressed by i. A signal of a pixel i is denoted as f(i). Here, an example that the signal f(i) of the pixel i includes three signal components of, for example, R, G and B, etc. It is assumed that signal values of the three signal components are expressed as $f_1(i)$, $f_2(i)$, $f_3(i)$ respectively. At this time, the signal f(i) of the pixel i can be expressed by a three-dimensional vector as shown in Equation (1).

$$f(i) = \begin{pmatrix} f_1(i) \\ f_2(i) \\ f_3(i) \end{pmatrix} \qquad \text{Equation (1)}$$

Moreover, the signal of the pixel i after processing (color reduction and expansion), which is carried out by the processing unit 1, is denoted as $f_{RED}(i)$. The signal values after processing, which are generated by carrying out the processing to $f_1(i)$, $f_2(i)$, $f_3(i)$ of f(i), are denoted as $f_{1RED}(i)$, $f_{2RED}(i)$, $f_{3RED}(i)$ respectively. That is, the signal $f_{RED}(i)$ is expressed as Equation (2).

$$f_{RED}(i) = \begin{pmatrix} f_{1RED}(i) \\ f_{2RED}(i) \\ f_{3RED}(i) \end{pmatrix} \qquad \text{Equation (2)}$$

Accordingly, when focusing on one pixel, an error of the signal value generated by the processing is $f(i) - f_{RED}(i)$. The color reduction error evaluation value calculating unit 2 calculates the color reduction error evaluation value which indicates the degree of magnitude of the error generated in a whole of the evaluation subject region. The color reduction error evaluation value is calculated as a value which becomes larger as the error becomes larger, and becomes smaller as the error becomes smaller.

For example, the color reduction error evaluation value calculating unit 2 may calculates a mean square error of the error between the signal value of the evaluation subject region before processing and the signal value of the evaluation subject region after processing, as the color reduction error evaluation value. Hereinafter, an example of calculating the mean square error as the color reduction error evaluation value will be described. It is assumed that the color reduction error evaluation value is denoted as H.

The color reduction error evaluation value calculating unit 2 may calculate the mean square error by calculating the following Equation (3) to calculate the color reduction error evaluation value H.

$$H = \frac{1}{N}\sum_{i=1}^{N}\sum_{k=1}^{3} |f_k(i) - f_{kRED}(i)|^2 \qquad \text{Equation (3)}$$

Here, k is a variable which indicates an order of the three components of the three-dimensional vector, and specifically k is 1, 2, or 3.

The processing unit 1 may use a color reduction processing method in which the signal before processing and the signal after processing satisfy the following Equation (A) and Equation (B).

$$\frac{1}{N}\sum_{i=1}^{N} f_k(i) = \frac{1}{N}\sum_{i=1}^{N} f_{kRED}(i) \qquad \text{Equation (A)}$$

$$\sum_{i=1}^{N} \{f_k(i) - f_{kRED}(i)\} f_{kRED}(i) = 0 \qquad \text{Equation (B)}$$

For example, when processing for reducing the number of colors to two, Equation (A) and Equation (B) are satisfied by setting two signal values, which the signal after the color reduction processing can have, so as to be equal to a mean of the signal values before processing of all pixels which are converted into the same color.

In this case, it is possible to calculate a mean square error of the color reduction error by calculating a subtraction between variance of the signal value of the evaluation subject region before processing (denoted as $\sigma^2_{SRC}$), and variance of the signal value of the evaluation subject region after processing (denoted as $\sigma^2_{RED}$). Accordingly, the color reduction error evaluation value calculating unit 2 may calculate the color reduction error evaluation value H by calculating the following Equation (4). When carrying out color reduction processing which has no assurance to satisfy Equation (A) and Equation (B), Equation (4) may be used as an approximation formula of the color reduction error evaluation value H.

$$H = \sigma_{SRC}^2 - \sigma_{RED}^2 \qquad \text{Equation (4)}$$

Here, Equation (3) and Equation (4) are exemplified as the formula for calculating the color reduction error evaluation value H. However, the color reduction error evaluation value calculating unit 2 may calculate the color reduction error evaluation value H with another calculation.

The importance determination unit 3 determines the semantic importance of the evaluation subject region on the basis of the color reduction error evaluation value H. For example, the importance determination unit 3 determines a value, which is larger as the color reduction error evaluation value H is smaller (that is, as the error caused by the color reduction and the expansion is smaller), as the importance. The above-mentioned mode for determining the importance is denoted as a mode A.

The importance determination unit 3 may determine the importance in consideration of a value other than the color reduction error evaluation value H. Hereinafter a case that the importance determination unit 3 determines the importance in consideration of the variance $\sigma^2_{SRC}$ of the signal value of the evaluation subject region before processing in addition to the color reduction error evaluation value H will be described. The above-mentioned mode for determining the importance is denoted as a mode B.

In the case of the mode B, the color reduction error evaluation value calculating unit 2 calculates both of the color reduction error evaluation value H and the variance $\sigma^2_{SRC}$ of the signal value of the evaluation subject region before processing. Then, the importance determination unit 3 calculates a ratio of the color reduction error evaluation value H to the variance $\sigma^2_{SRC}$ of the signal value of the evaluation subject region before processing. Hereinafter, the ratio ($H/\sigma^2_{SRC}$) is denoted as a color reduction error rate. The importance determination unit 3 determines the importance which is larger as a value of $H/\sigma^2_{SRC}$ is smaller.

It is also possible to calculate the color reduction error rate $H/\sigma^2_{SRC}$ by calculating the following Equation (5).

$$H/\sigma^2_{SRC} = 1 - (\sigma^2_{RED}/\sigma^2_{SRC}) \qquad \text{Equation (5)}$$

Accordingly, the importance determination unit 3 may calculate the color reduction error rate $H/\sigma^2_{SRC}$ by calculating Equation (5). In this case, the color reduction error evaluation value calculating unit 2 calculates the variance $\sigma^2_{SRC}$ of the signal value of the evaluation subject region before processing and the variance $\sigma^2_{RED}$ of the signal value of the evaluation subject region after processing. The importance determination unit 3 uses the values to calculate Equation (5).

Moreover, the importance determination unit 3 may determine the importance in consideration of the variance $\sigma^2_{SRC}$ of the signal value of the evaluation subject region before processing and the variance $\sigma^2_{RED}$ of the signal value of the evaluation subject region after processing in addition to the color reduction error evaluation value H. The above-mentioned mode is denoted as a mode C.

In the case of the mode C, the color reduction error evaluation value calculating unit 2 calculates the variance $\sigma^2_{SRC}$ of the signal value of the evaluation subject region before processing and the variance $\sigma^2_{RED}$ of the signal value of the evaluation subject region after processing in addition to the color reduction error evaluation value H. Then, the importance determination unit 3 determines a value, which becomes large as the color reduction error rate $H/\sigma^2_{SRC}$ becomes small and the variance $\sigma^2_{RED}$ of the signal value of the evaluation subject region after processing becomes large, as the importance of the evaluation subject region.

Here, it is also possible to realize the mode C by carrying out the following process. The color reduction error evaluation value calculating unit 2 calculates the variance $\sigma^2_{SRC}$ of the signal value of the evaluation subject region before processing and the variance $\sigma^2_{RED}$ of the signal value of the evaluation subject region after processing. Then, the importance determination unit 3 uses the calculated variance $\sigma^2_{SRC}$ and variance $\sigma^2_{RED}$ to calculate an index value shown in the following Equation (6).

$$\frac{(\sigma^2_{RED})^{1+\alpha}}{\sigma^2_{SRC}} \qquad \text{Equation (6)}$$

Here, $\alpha$ is a constant which is determined so as to be a real number larger than 0.

Then, the importance determination unit 3 determines the importance which is larger as the index value shown in Equation (6) is larger.

The processing unit 1, the color reduction error evaluation value calculating unit 2 and the importance determination unit 3 are realized, for example, by a CPU of a computer which operates according to an in-image region importance evaluating program. For example, the CPU may read the in-image region importance evaluating program, and then operate according to the program as the processing unit 1, the color reduction error evaluation value calculating unit 2 and the importance determination unit 3. The in-image region importance evaluating program may be recorded by a recording medium which the computer can read. Moreover, the processing unit 1, the color reduction error evaluation value calculating unit 2 and the importance determination unit 3 may be realized by different pieces of hardware.

Figure 2:
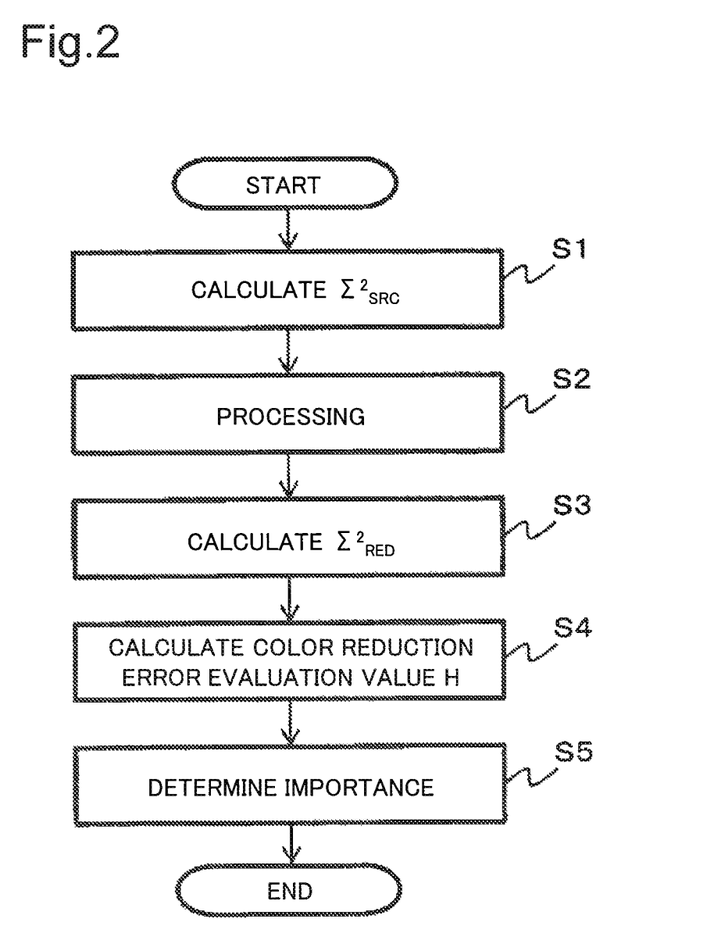
FIG. 2 is a flowchart showing an example of a procedure of processes according to the present invention.

Next, an example of a procedure of processes according to the present exemplary embodiment will be described. FIG. 2 is a flowchart showing the procedure of processes of the present exemplary embodiment. An example that one evaluation subject region is given, and importance of the evaluation subject region is determined will be described in the following. In the case that a plurality of the evaluation subject regions are given, the in-image region importance evaluating device 10 may carry out processes, which are the same as processes shown in the following, per the evaluation subject region.

Moreover, an example that the processing unit 1 carries out the color reduction by reducing the signal component of the pixel will be described in the following.

Firstly, the color reduction error evaluation value calculating unit 2 calculates the variance $\sigma^2_{SRC}$ of the signal value of the given evaluation subject region (that is, the evaluation subject region before processing).

Here, it is assumed that the signal of each pixel of the evaluation subject region before processing is expressed by the three-dimensional vector show in Equation (1). Moreover, it is assumed that $f_1(i)$, $f_2(i)$ and $f_3(i)$ are signal values of R, G and B respectively. Furthermore, it is assumed that the number of pixels existing within the evaluation subject region is N.

In step S1, the color reduction error evaluation value calculating unit 2 calculates a mean vector $\mu = (\mu_1, \mu_2, \mu_3)^T$ and a covariance matrix (denoted as $\Sigma_{SRC}$) of the signal of the pixel existing within the evaluation subject region. Here, T means a transpose matrix. The color reduction error evaluation value calculating unit 2 may calculate $\mu$ by calculating the following Equation (7).

$$\mu = \frac{1}{N}\sum_{i=1}^{N} f(i) \qquad \text{Equation (7)}$$

Then, the color reduction error evaluation value calculating unit 2 calculates the covariance matrix $\Sigma_{SRC}$ by calculating the following Equation (8).

$$\Sigma_{SRC} = \overline{ff^T} - \mu\mu^T \qquad \text{Equation (8)}$$

Here, the color reduction error evaluation value calculating unit 2 may calculate a first term of a right side of Equation (8) by calculating the following Equation (9).

$$\overline{ff^T} = \frac{1}{N}\sum_{i=1}^{N} f(i)f(i)^T \qquad \text{Equation (9)}$$

The covariance matrix $\Sigma_{SRC}$ is a matrix which has three rows and three columns. Here, a component of a p-th row and a q-th column is denoted as $\Sigma_{pq}$. A sum of diagonal components of a matrix A is denoted as tr(A)

The color reduction error evaluation value calculating unit 2 calculates the variance $\sigma^2_{SRC}$ of the signal value of the evaluation subject region before processing by calculating a sum of diagonal components of the covariance matrix $\Sigma_{SRC}$. That is, the color reduction error evaluation value calculating unit 2 calculates $\sigma^2_{SRC}$ by calculating the following Equation (10).

$$\sigma^2_{SRC} = tr(\Sigma_{SRC}) = \Sigma_{11} + \Sigma_{22} + \Sigma_{33} \qquad \text{Equation (10)}$$

Next, the processing unit 1 carries out the color reduction to the given evaluation subject region, and carries out the expansion to the evaluation subject region after the color reduction (Step S2).

Here, it is assumed that the processing unit 1 carries out the color reduction and compression by linear-projecting a three-dimensional color signal, which is expressed by the signal values of R, G and B, onto an one-dimensional gray scale signal. A one-dimensional gray scale signal after the color reduction of the pixel i is denoted as g(i).

The processing unit 1 carries out the color reduction to each pixel of the evaluation subject region by carrying out the following Equation (11) per the pixel existing within the evaluation subject region.

$$g(i) = w \cdot (f(i) - \mu) = \begin{pmatrix} w_1 \\ w_2 \\ w_3 \end{pmatrix} \cdot \begin{pmatrix} f_1(i) - \mu_1 \\ f_2(i) - \mu_2 \\ f_3(i) - \mu_3 \end{pmatrix} \quad \text{Equation (11)}$$

In Equation (11), μ is the mean vector of the signal of the pixel existing within the evaluation subject region calculated by calculating Equation (7). In addition, w is a three-dimensional vector whose components are $w_1$, $w_2$ and $w_3$ in Equation (11). Specifically, in order to minimize the color reduction error evaluation value H, w is determined as follows. Firstly, the processing unit 1 calculates an eigenvector v which is corresponding to the maximum eigenvalue $\lambda_{MAX}$, out of eigenvectors of the covariance matrix $\Sigma_{SRC}$. v is a three-dimensional vector whose components are $v_1$, $v_2$ and $v_3$. The vector w is calculated by calculating the following Equation (12) by use of the eigenvector v.

$$w = \frac{v}{|v|^2} = \frac{v}{(v_1)^2 + (v_2)^2 + (v_3)^2} \quad \text{Equation (12)}$$

By calculating Equation (11) by use of the mean vector μ of the signal of the pixel, and the vector w given by Equation (12), the processing unit 1 converts (carry out color reduction) the signal of the pixel into the one-dimensional gray scale signal g(i).

Next, the processing unit 1 carries out the expansion to the evaluation subject region to which the color reduction has been carried out. In the case that the color reduction is carried out as described above, by calculating the following Equation (13) per the pixel existing within the evaluation subject region to which the color reduction has been carried out, the processing unit 1 calculates the signal $f_{RED}(i)$ to which the color reduction and the expansion have been carried out.

$$f_{RED}(i) = g(i)v + \mu = \begin{pmatrix} v_1 g(i) + \mu_1 \\ v_2 g(i) + \mu_2 \\ v_3 g(i) + \mu_3 \end{pmatrix} \quad \text{Equation (13)}$$

After Step S2, the color reduction error evaluation value calculating unit 2 calculates the variance $\sigma^2_{RED}$ of the signal value of the evaluation subject region after processing (after carrying out color reduction and expansion in Step 2) (Step S3).

In Step S3, the color reduction error evaluation value calculating unit 2 may calculate the variance $\sigma^2_{RED}$ on the basis of the maximum eigenvalue $\lambda_{MAX}$ of the covariance matrix $\Sigma_{SRC}$. That is, the color reduction error evaluation value calculating unit 2 may calculate $\sigma^2_{RED}$ as $\sigma^2_{RED} = \lambda_{MAX}$.

After Step S3, the color reduction error evaluation value calculating unit 2 calculates the color reduction error evaluation value H, for example, by calculating Equation (4) (Step S4). In the present example, the color reduction error evaluation value H is calculated by the following Equation (14).

$$H = \sigma_{SRC}^2 - \sigma_{RED}^2 = \Sigma_{11} + \Sigma_{22} + \Sigma_{33} - \lambda_{MAX} \quad \text{Equation (14)}$$

Next, the importance determination unit 3 determines the importance of the given evaluation subject region on the basis of the color reduction error evaluation value H which is calculated in Step S4 (Step S5). For example, the importance determination unit 3 may determine the importance which is larger as the color reduction error evaluation value H is smaller. Alternatively, the importance determination unit 3 may determine the importance by using the method of the above-mentioned mode B or C.

The above-mentioned procedure of processes is an example of a procedure of reducing the three signal components of R, G and B to the one signal component (in the above-mentioned case, the one-dimensional gray scale signal). This procedure of processes is denoted as a procedure of processes 1.

An example of a procedure of processes which is carried out when reducing the number of colors of the evaluation subject region at a time of carrying out the color reduction will be described in the following. Here, it is assumed that the number of colors after the color reduction is M. The procedure of processes described in the following is denoted as a procedure of processes 2. The procedure of processes 2 is described with reference to the flowchart shown in FIG. 2.

The color reduction error evaluation value calculating unit 2 calculates the variance $\sigma^2_{SRC}$ of the signal value of the given evaluation subject region (Step S1). In the present example, the color reduction error evaluation value calculating unit 2 calculates the variance of the signal value of the evaluation subject region per the signal component, and furthermore calculates a sum of each variance. Then, the color reduction error evaluation value calculating unit 2 defines the calculation result as the variance $\sigma^2_{SRC}$ of the signal value of the evaluation subject region.

In Step S1, the color reduction error evaluation value calculating unit 2 calculates not only the variance $\sigma^2_{SRC}$ but also the mean vector μ of the signal of each pixel existing within the evaluation subject region. The color reduction error evaluation value calculating unit 2 may calculate the mean vector μ by calculating the above-mentioned Equation (7).

Next, the processing unit 1 carries out the color reduction to the given evaluation subject region, and carries out the expansion to the evaluation subject region to which the color reduction has been carried out (Step S2).

In the present example, the processing unit 1 carries out the color reduction of reducing the number of colors of the evaluation subject region to M colors. For example, the processing unit 1 carries out the color reduction as shown in the following. The processing unit 1 carries out to cluster the signal f(i) (i=1, 2, . . . , N) of each pixel of the evaluation subject region, and classifies the signal f(i) of each pixel into M classes. A method of clustering is not limited in particular.

The processing unit 1 calculates the mean vector of the signal of each pixel belonging to each class out of the M classes into which the signal f(i) of each pixel is classified.

Then, the processing unit 1 determines the mean vector, which is calculated per the class, to be a color signal corresponding to the class. As a result, the number of colors of the evaluation subject region is reduced to the M kinds.

After Step S2, the color reduction error evaluation value calculating unit 2 calculates the variance $\sigma^2_{RED}$ of the signal value of the evaluation subject region after processing (Step S3). In the present example, the color reduction error evaluation value calculating unit 2 calculates a matrix $\Sigma_{RED}$ by calculating the following Equation (15).

$$\Sigma_{RED} = \sum_{k=1}^{3}\left\{\sum_{c=1}^{M} p_c(\mu_k^c)^2 - (\mu_k)^2\right\} \quad \text{Equation (15)}$$

Here, c, which is a variable indicating each class out of the M classes, is 1, 2, . . . , M. $p_c$ with a subscript c is a ratio of number of pixels classified as a class c, to number of all pixels existing within the evaluation subject region. Accordingly, a total sum of $p_c$ (c=1, 2, . . . , M) is 1. That is, the following Equation (16) is established.

$$\sum_{c=1}^{M} p_c = 1 \quad \text{Equation (16)}$$

In addition, the mean vector of the signal of each pixel, which belongs to the class c, is denoted as $\mu^c = (\mu_1^c, \mu_2^c, \mu_3^c)^T$. In Equation (15), a k-th component of the vector $\mu^c$ is denoted as $\mu_k^c$. Moreover, a k-th component of $\mu$ (a mean vector of signals of each pixel existing within the evaluation subject region), which is calculated in Step S1, is denoted as $\mu_k$.

The color reduction error evaluation value calculating unit 2 calculates a sum of diagonal components of the matrix $\Sigma_{RED}$, which is calculated by calculating Equation (15), as the variance $\sigma^2_{RED}$ of the signal value of the evaluation subject region after processing. That is, the color reduction error evaluation value calculating unit 2 calculates the variance $\sigma^2_{RED}$ by calculating the following Equation (17).

$$\sigma_{RED}^2 = tr(\Sigma_{RED}) \quad \text{Equation (17)}$$

Processes (Steps S4 and S5), which are carried out after calculation of the variance $\sigma^2_{RED}$, are the same as ones of the procedure of processes 1, description on these steps is omitted.

The above-mentioned processes can be carried out even if the evaluation subject region is expressed in the gray scale.

According to the procedure of processes 2, the case that the number of colors is reduced to M at the time of carrying out the color reduction has been described. The processing unit 1 may reduce the number of colors to 2, that is, may set M to be 2 (That is, the processing unit 1 may carry out binarization). An example of clustering, which is carried out when carrying out binarization, will be described in the following.

(Example 1 of Clustering in the Case of Carrying out Binarization)

The processing unit 1 calculates the covariance matrix $\Sigma_{SRC}$, which has three rows and three columns, on the basis of the evaluation subject region. Since the calculation method of $\Sigma_{SRC}$ has been described already, description on the calculation method is omitted. Then, the processing unit 1 calculates the eigenvector v which is corresponding to the maximum eigenvalue of the covariance matrix $\Sigma_{SRC}$.

Next, per the pixel existing within the evaluation subject region, the processing unit 1 calculates an inner product $(f(i)-\mu)\cdot v$ on the basis of a difference of the signal $f(i)$ from the mean vector $\mu$ of the signal of each pixel existing within the evaluation subject region, and the above-mentioned eigenvector v, and classifies the pixel into any one of two classes according to a judgment whether a value of the inner product is positive or negative. If the calculated inner product is positive, the processing unit 1 classifies the pixel into a first class, and if the calculated inner product is negative, the processing unit 1 classifies the pixel into a second class. As a result, the color of the evaluation subject region is binarized. Other points are the same as the above-mentioned procedure of processes 2.

(Example 2 of Clustering in the Case of Carrying out Binarization)

The processing unit 1 may carry out the binarization as shown in the following. The processing unit 1 calculates the variance of the signal value per signal component (in other words, per R, G and B) of the pixel existing within the evaluation subject region), and specifies a signal component which has the maximum variance. The signal component is denoted as X. The processing unit 1 calculates a mean value of the signal component X of each pixel existing within the evaluation subject region. The mean is denoted as $\mu_X$. $\mu_X$ is a scalar. The processing unit 1 classifies the pixel into any one of two classes on the basis of a result of comparing the signal component X to the pixel with $\mu_X$. For example, in the case that the signal component X of the pixel is larger than $\mu_X$, the processing unit 1 classifies the pixel into a first class, and in the case that the signal component X of the pixel is smaller than $\mu_X$, the processing unit 1 classifies the pixel into a second class. Other points are the same as the above-mentioned procedure of processes 2.

Since it is enough in the present exemplary embodiment if it is possible to judge that the signal is biased toward two colors, it is enough if the binarization is carried out at the time of carrying out the color reduction, when adopting the procedure of processes 2. In the case that the above-mentioned method is used when carrying out the b binarization at the time of carrying out the color reduction, it is possible to reduce number of calculations and a volume of used memory in comparison with the usual method which carries out the binarization by calculating a threshold level from a histogram.

According to the present exemplary embodiment, the semantic importance of the evaluation subject region is determined larger as the error caused by carrying out the processing (color reduction and expansion) to the evaluation subject region becomes small. Considering that the error is small, it is conceivable that the evaluation subject region is expressed in a small number of colors. Furthermore, an area which is expressed in a small number of colors often displays a character, a line drawing, an icon or the like which is semantically important. Therefore, according to the present exemplary embodiment, it is possible to accurately determine the importance of the evaluation subject region displaying the character, the line drawing, the icon or the like which is semantically important. In addition, according to the present exemplary embodiment, it is possible to accurately determine the importance of also a region of an anti-aliased image, or a region of an image which is continuously gradated. Moreover, it is possible to lower the possibility that excessive importance is assigned to the region of the natural image which has the large local-change and the large variance.

Figure 3:
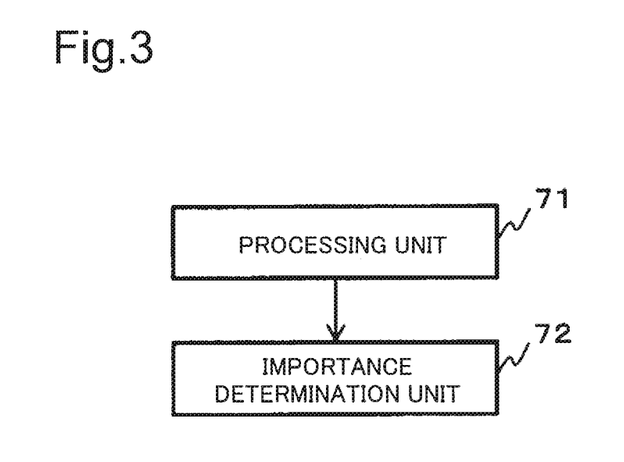
FIG. 3 is a block diagram showing a main component of the in-image region importance evaluating device according to the present invention.

Hereinafter, a main component of the present exemplary embodiment will be described. FIG. 3 is a block diagram showing a main component of the in-image region importance evaluating device of the present exemplary embodiment. The in-image region importance evaluating device of the present exemplary embodiment includes a processing unit 71 and an importance determination unit 72.

The processing unit 71 (for example, the processing unit 1) carries out the processing, which includes the color reduction, to the evaluation subject region of the image.

The importance determination unit 72 (for example, the importance determination unit 3) determines the importance of the evaluation subject region on the basis of the degree of magnitude of the error between the signal value of the evaluation subject region before processing and the signal value of the evaluation subject region after processing.

By such a configuration, it is possible to appropriately evaluate the semantic importance of the in-image region.

A part of or a whole of the above-mentioned exemplary embodiment can be described as the following Supplementary Note. However, the present invention is not limited to Supplementary Note.

(Supplementary Note 1) An in-image region importance evaluating device comprising:
processing means which carries out processing, which includes color reduction, to an evaluation subject region of an image; and
importance determination means which determines importance of the evaluation subject region on the basis of magnitude of a difference between a signal value of the evaluation subject region before processing and a signal value of the evaluation subject region after processing.

(Supplementary Note 2) The in-image region importance evaluating device according to Supplementary Note 1, comprising:
color reduction error evaluation value calculating means which calculates a color reduction error evaluation value indicative of the magnitude of the difference between the signal value of the evaluation subject region before processing and the signal value of the evaluation subject region after processing, as a means square error of the difference.

(Supplementary Note 3) The in-image region importance evaluating device according to Supplementary Note 2, wherein
the importance determination means determines a the importance of the evaluation subject region which becomes larger while the color reduction error evaluation value becomes smaller.

(Supplementary Note 4) The in-image region importance evaluating device according to Supplementary Note 2, wherein
the importance determination means determines the importance of the evaluation subject region which becomes larger while a ratio of the color reduction error evaluation value to variance of the signal value of the evaluation subject region before processing becomes smaller.

(Supplementary Note 5) The in-image region importance evaluating device according to Supplementary Note 2, wherein
the importance determination means determines the importance of the evaluation subject region which is larger as a ratio of the color reduction error evaluation value to variance of the signal value of the evaluation subject region before processing is smaller and variance of the signal value of the evaluation subject region after processing is larger.

(Supplementary Note 6) The in-image region importance evaluating device according to any one of Supplementary Note 1 to Supplementary Note 5, wherein
the processing means carries out the color reduction by reducing number of signal components of the evaluation subject region.

(Supplementary Note 7) The in-image region importance evaluating device according to any one of Supplementary Note 1 to Supplementary Note 5, wherein
the processing means carries out the color reduction by reducing number of colors of the evaluation subject region.

(Supplementary Note 8) An in-image region importance evaluating device comprising:
a processing means which carries out processing, which includes color reduction, to an evaluation subject region of an image;
a calculation means which calculates variance of a signal value of the evaluation subject region before processing and variance of a signal value of the evaluation subject region after processing; and
an importance determination means which determines importance of the evaluation subject region on the basis of the variance of the signal value of the evaluation subject region before processing and the variance of the signal value of the evaluation subject region after processing.

(Supplementary Note 9) An in-image region importance evaluating method comprising:
carrying out processing, which includes color reduction, to an evaluation subject region of an image; and
determining importance of the evaluation subject region on the basis of magnitude of a difference between a signal value of the evaluation subject region before processing and a signal value of the evaluation subject region after processing.

(Supplementary Note 10) An in-image region importance evaluating method, characterized by comprising:
carrying out processing, which includes color reduction, to an evaluation subject region of an image;
calculating variance of a signal value of the evaluation subject region before processing and variance of a signal value of the evaluation subject region after processing; and
determining importance of the evaluation subject region on the basis of the variance of the signal value of the evaluation subject region before processing and the variance of the signal value of the evaluation subject region after processing.

(Supplementary Note 11) An in-image region importance evaluating program that causes a computer to execute:
a processing process of carrying out processing, which includes color reduction, to an evaluation subject region of an image; and
a importance determination process of determining importance of the evaluation subject region on the basis of magnitude of a difference between a signal value of the evaluation subject region before processing and a signal value of the evaluation subject region after processing.

(Supplementary Note 12) An in-image region importance evaluating program that causes a computer to execute:
a processing process of carrying out processing, which includes color reduction, to an evaluation subject region of an image;
a calculation process of calculating variance of a signal value of the evaluation subject region before processing and variance of a signal value of the evaluation subject region after processing; and an importance determination process of determining importance of the evaluation subject region on the basis of the variance of the signal value of the evaluation subject region before processing and the variance of the signal value of the evaluation subject region after processing.

This application is based upon and claims the benefit of priority from Japanese Patent Application No. 2013-092267, filed on Apr. 25, 2013, the disclosure of which is incorporated herein in its entirety by reference.

As mentioned above, the invention according to the present application has been described with reference to the exemplary embodiments. However, the invention according to the present application is not limited to the exemplary embodiments. Various changes, which are included in the scope of the invention according to the present application and which a person skilled in the art can understand, can be added to the configuration and the details of the invention according to the present application.

INDUSTRIAL APPLICABILITY

The present invention is preferably applied to the in-image region importance evaluating device which evaluates the importance of the in-image region.

REFERENCE SIGNS LIST 1 processing unit
2 color reduction error evaluation value calculating unit
3 importance determination unit
10 in-image region importance evaluating device

The invention claimed is:

1. An in-image region importance evaluating device comprising:
   a processing unit which carries out processing, which includes color reduction, to an evaluation subject region of an image; and
   an importance determination unit which determines importance of the evaluation subject region on the basis of magnitude of a difference between a signal value of the evaluation subject region before processing and a signal value of the evaluation subject region after processing.

2. The in-image region importance evaluating device according to claim 1, comprising:
   a color reduction error evaluation value calculating unit which calculates a color reduction error evaluation value indicative of the degree of magnitude of the difference between the signal value of the evaluation subject region before processing and the signal value of the evaluation subject region after processing, as a means square error of the difference.

3. The in-image region importance evaluating device according to claim 2, wherein
   the importance determination unit determines the importance of the evaluation subject region which becomes larger while the color reduction error evaluation value becomes smaller.

4. The in-image region importance evaluating device according to claim 2, wherein
   the importance determination unit determines the importance of the evaluation subject region which becomes larger while a ratio of the color reduction error evaluation value to variance of the signal value of the evaluation subject region before processing becomes smaller.

5. The in-image region importance evaluating device according to claim 2, wherein
   the importance determination unit determines the importance of the evaluation subject region which becomes larger while a ratio of the color reduction error evaluation value to variance of the signal value of the evaluation subject region before processing is smaller and variance of the signal value of the evaluation subject region after processing becomes larger.

6. The in-image region importance evaluating device according to claim 1, wherein
   the processing unit carries out the color reduction by reducing number of signal components of the evaluation subject region.

7. The in-image region importance evaluating device according to claim 1, wherein
   the processing unit carries out the color reduction by reducing number of colors of the evaluation subject region.

8. An in-image region importance evaluating method comprising:
   carrying out processing, which includes color reduction, to an evaluation subject region of an image; and
   determining importance of the evaluation subject region on the basis of magnitude of a difference between a signal value of the evaluation subject region before processing and a signal value of the evaluation subject region after processing.

9. A non-transitory computer readable storage medium recording thereon a program that causes a computer to execute:
   a processing process of carrying out processing, which includes color reduction, to an evaluation subject region of an image; and
   a importance determination process of determining importance of the evaluation subject region on the basis of magnitude of a difference between a signal value of the evaluation subject region before processing and a signal value of the evaluation subject region after processing.

* * * * *

UNITED STATES PATENT AND TRADEMARK OFFICE
CERTIFICATE OF CORRECTION

PATENT NO.       : 9,514,544 B2
APPLICATION NO.  : 14/786938
DATED            : December 6, 2016
INVENTOR(S)      : Hatabu It is certified that error appears in the above-identified patent and that said Letters Patent is hereby corrected as shown below:

In Claim 9, Column 16, Line 47, delete "a importance" and insert --an importance--.

Signed and Sealed this
Twenty-first Day of March, 2017

Michelle K. Lee
*Director of the United States Patent and Trademark Office*